(12) United States Patent
M R et al.

(10) Patent No.: US 10,734,763 B2
(45) Date of Patent: *Aug. 4, 2020

(54) PRINTED CIRCUIT BOARD RETENTION BANDS

(71) Applicant: Hewlett Packard Enterprise Development LP, Houston, TX (US)

(72) Inventors: Senthil Kumar M R, Bangalore (IN); Vigneshwara Upadhyaya, Bangalore (IN); Mukundan Gangadurai, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,582

(22) Filed: Feb. 7, 2019

(65) Prior Publication Data

US 2019/0326707 A1    Oct. 24, 2019

Related U.S. Application Data

(63) Continuation of application No. 15/958,386, filed on Apr. 20, 2018, now Pat. No. 10,211,572.

(51) Int. Cl.
*H01R 13/62* (2006.01)
*H01R 13/639* (2006.01)
(Continued)

(52) U.S. Cl.
CPC .......... *H01R 13/639* (2013.01); *G06F 1/185* (2013.01); *H01R 12/7023* (2013.01); *H01R 12/7029* (2013.01); *H01R 12/721* (2013.01)

(58) Field of Classification Search
CPC .............. H01R 23/682; H01R 23/7005; H01R 23/7068; H01R 13/518; H01R 25/142
(Continued)

(56) References Cited

U.S. PATENT DOCUMENTS 4,598,962 A    7/1986  Reitz et al.
4,702,709 A   10/1987  Santilli
(Continued)

FOREIGN PATENT DOCUMENTS

CN    2446570 Y    9/2001
CN    2710038 Y    7/2005
(Continued)

OTHER PUBLICATIONS

Unknown, Poll: Would You Ship a PC in the Box the Case Came In?, (Web Page), Aug. 15, 2001, 13 Pgs.
(Continued)

*Primary Examiner* — Phuong Chi Thi Nguyen
(74) *Attorney, Agent, or Firm* — Brooks, Cameron & Huebsch, PLLC

(57) ABSTRACT

In some examples, a socket locking system can comprise a socket; a printed circuit board (PCB) card disposed in the socket; a first locking handle and a second locking handle to lock the PCB card in the socket; and a PCB retention band including: an elongated closed loop forming a first distal end and a second distal end opposite from the first distal end, wherein the first distal end is to contact the first locking handle and the second distal end is to contact the second locking handle; and a retention portion coupled to the elongated closed loop of material to contact a top surface of the PCB card to disposition the PCB card in the socket.

12 Claims, 4 Drawing Sheets

(51) Int. Cl.
  *G06F 1/18* (2006.01)
  *H01R 12/70* (2011.01)
  *H01R 12/72* (2011.01)

(58) Field of Classification Search
  USPC .............. 439/326, 328, 637, 540.1, 64, 94
  See application file for complete search history.

(56) References Cited

U.S. PATENT DOCUMENTS

| | | |
|---|---|---|
| 5,268,820 A | 12/1993 | Tseng et al. |
| 6,517,369 B1 | 2/2003 | Butterbaugh et al. |
| 7,371,097 B1 | 5/2008 | Pennypacker et al. |
| 7,695,313 B2 | 4/2010 | Karim |
| 7,736,153 B2 | 6/2010 | Cheng |
| 8,472,178 B2 | 6/2013 | Hartman et al. |
| 9,245,820 B2 | 1/2016 | Goldrian et al. |
| 2003/0200630 A1* | 10/2003 | Feldmeyer ............... A45F 5/10 16/422 |
| 2005/0221629 A1 | 10/2005 | Woellner et al. |
| 2007/0123105 A1 | 5/2007 | Tsukashima |
| 2008/0076291 A1 | 3/2008 | Ewing |
| 2018/0062287 A1 | 3/2018 | Shaw et al. |

FOREIGN PATENT DOCUMENTS

| | | |
|---|---|---|
| CN | 101242041 A | 8/2008 |
| WO | WO-2012102722 | 8/2012 |

OTHER PUBLICATIONS

European Search Report Received for EP Patent Application No. 19170319.8, dated Sep. 13, 2019, 8 pages.

* cited by examiner

PRINTED CIRCUIT BOARD RETENTION BANDS

BACKGROUND

A network device can operate in accordance with a wireless specification such as those created by the institute of Electrical and Electronics Engineers (IEEE) LAN/MAN Standards Committee (IEEE 802) provide media access control (MAC) and physical layer (PHY) specifications for implementing wireless local area network (WLAN) computer communication. A network device can be transported from a given location to another location. For instance, a network device can be transported from a point of manufacture and/or from a supplier to a retailer and/or to an end user of the network device.

DETAILED DESCRIPTION

Figure 1:
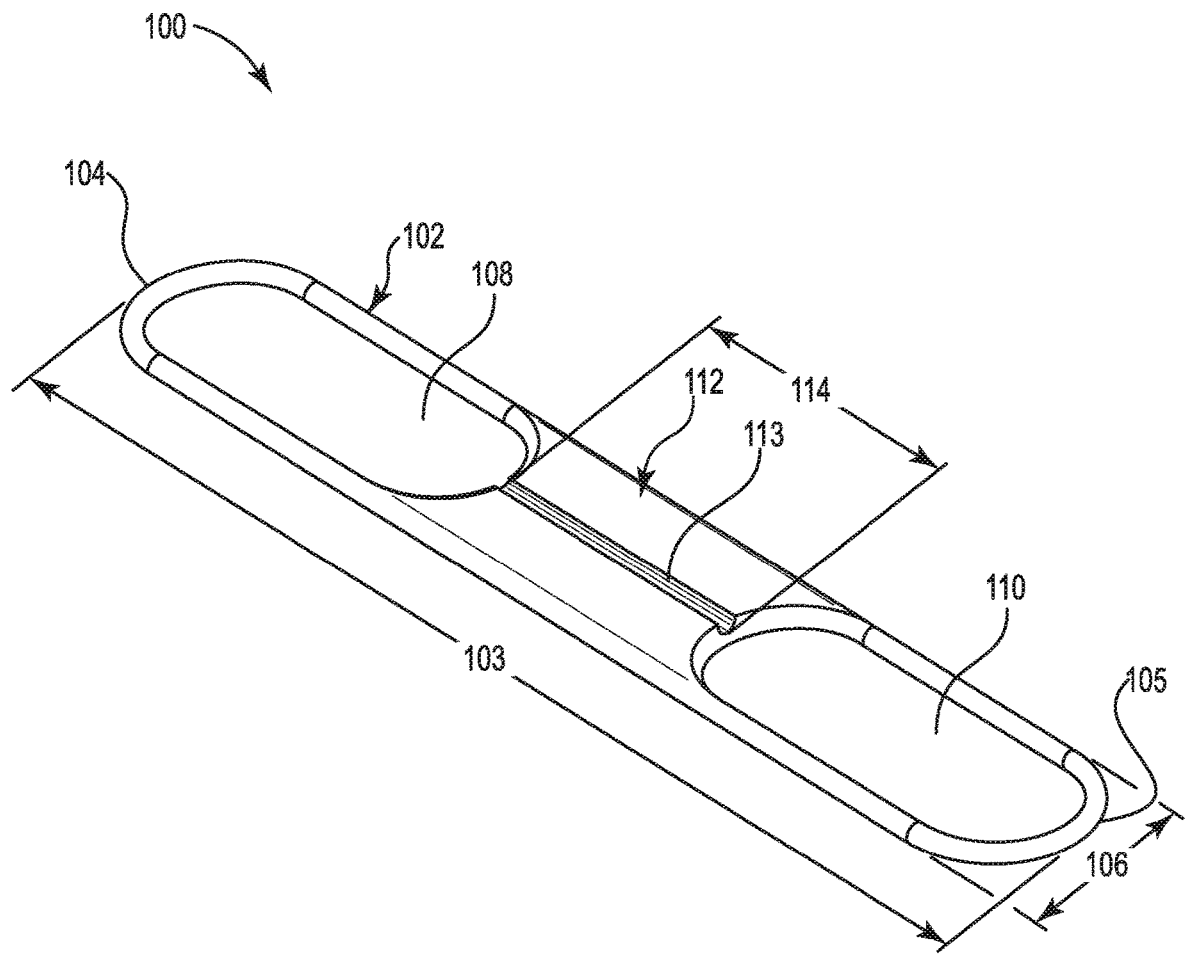
FIG. 1 illustrates an example of a printed circuit board retention band consistent with the disclosure.

As mentioned, network devices can be transported. For instance, a network device can be transported from a point of manufacture and/or a supplier to a retailer and/or an end user of the network device. However, during transportation a network device can encounter shock and/or vibrations. As a result, a network device can become damaged and/or components of the network device may become decoupled/electrically disconnected from each other. For instance, internal processing components of a network device, such as a printed circuit board (PCB) for example, can become damaged and/or decoupled/electrically disconnected during transportation. The processing component can be a dual in-line memory module (DIMM), among other types of processing components. The DIMM or other type of PCB card can be coupled to a socket (e.g., a DIMM socket connector) to provide electrical connection between a PCB of a network device and the DIMM or other type of PCB card. However, shock and/or vibration during transportation can exert enough force on the socket to cause the DIMM to dislodge from the socket, thus eliminating or creating a partial loss of electrical contact between the DIMM and the socket. As a result, the network device including the dislodged DIMM can fail to operate as intended and/or the DIMM may have to be 're-seated' in the socket for the network device to operate as intended.

As such, some approaches attempt to retain a DIMM in a socket by attempting to prevent locking handles from unintentionally releasing. Such approaches may use of an adhesive such as tape for example. However, as the tape may have to be wide enough to hold the both socket locking handles in place, it also has the potential to block air flow to the DIMM components (e.g., memory modules). Moreover, such approaches may merely arrest the locking handles (and thereby a DIMM module) in a horizontal axis that is substantially parallel to the PCB, not a vertical axis.

Accordingly, the disclosure is directed to PCB retention bands, socket locking systems including PCB retention bands, and network devices including PCB retention bands. For instance, a socket locking system can include a socket, a PCB card disposed in the socket, a first locking handle and a second locking handle to lock the PCB card in the socket, and a PCB retention band. The PCB retention band can include an elongated closed loop forming a first distal end and a second distal end opposite from the first distal end where the first distal end is to contact the first locking handle and the second distal end is to contact the second locking handle and a retention portion coupled to the elongated closed loop of material to contact a top surface of the PCB card to disposition the PCB card in the socket, as described herein. Notably, PCB retention bands herein can arrest movement of PCB cards, such as a DIMM, along each of a vertical axis and horizontal axis, as described herein, and are also free of locking handle adapters and/or other additional components that may be employed with other approaches such as those the merely seek to prevent unintended release of locking handles.

FIG. 1 illustrates an example of a PCB retention band 100 consistent with the disclosure. As illustrated in FIG. 1, the PCB retention band 100 can include an elongated closed loop 102 and a retention portion 112.

As used herein, the term "elongated closed loop" can, for example, refer to a closed curve whose initial and final points coincide in a fixed point and the closed curve having a length that is greater than its width. For instance, as illustrated in FIG. 1, the elongated closed loop 102 is formed of a closed curve and has a length 103 that is greater than a width 106 of the elongated closed loop 102. The length 103 of the elongated closed loop 102 is from a first distal end 104 to a second distal end of the elongated closed loop 102. As illustrated in FIG. 1, the width 106 is substantially orthogonal to the length 103. As detailed herein, the first distal end 104 can contact a first locking handle of a socket while the second distal end 105 can contact a second locking handle of the socket.

In some examples, the elongated closed loop 102 defines an opening such as a first opening 108 and/or a second opening 110. Having an opening such as the first opening 108 and/or the second opening 110 can permit the retention portion 112 to contact a top surface of a PCB card. For instance, as illustrated in FIG. 1, the retention portion 112 can be disposed between the first opening 108 and the second opening 110 to position the retention portion to contact a top surface of a PCB card, as described herein. That is, as illustrated in FIG. 1, a length 114 of the retention portion 112 can less than a length 103 of the elongated closed loop 102 to permit a portion of a PCB card to pass through the first opening 108 and/or the second opening 110 and thereby permit the retention portion 112 to contact a top surface of a PCB card, as detailed herein.

As used herein, "retention portion" can, for example, refer to a portion of a PCB retention band disposed between a first distal end and a second distal end that is to contact a top surface of a PCB card when the PCB retention band is coupled to a PCB including the PCB card. As illustrated in FIG. 1, the retention portion 112 can be integral with the elongated closed loop 102. That is, the retention portion can be formed of the same material and continuous with the elongated closed loop 102. However, the disclosure is not so limited. Rather, in some examples the retention portion 112 can be a separate and distinct component that is coupled (via adhesive, mechanical coupling mechanism, and/or other coupling mechanism) to the elongated closed loop 102.

In some examples, the elongated closed loop 102 can be formed of a flexible material. Examples of flexible materials include rubber, silicone rubber, and/or combinations thereof. Similarly, in some examples, the retention portion 112 can be formed of a flexible material. However, in some examples the retention portion 112 can include and/or be formed of various other materials such as metal, various plastics, nylon, etc. For instance, in various examples where the retention portion 112 is separate and distinct from the elongated closed loop 102 the retention portion 112 can be formed of a different material than a material of the elongated closed loop 102.

Figure 2:
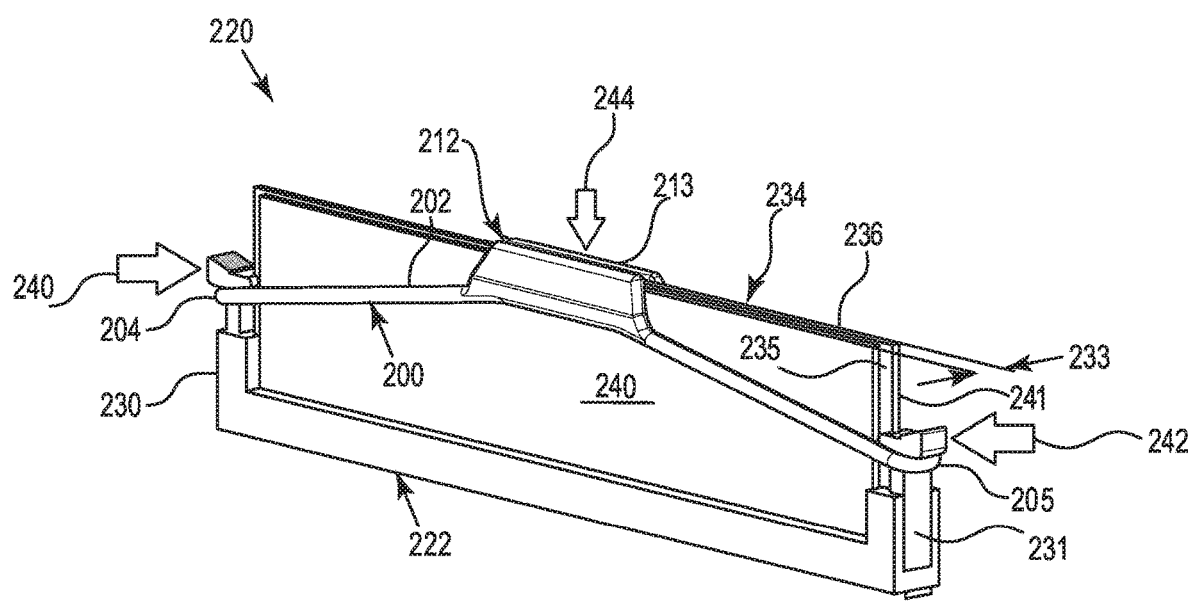
FIG. 2 illustrates a diagram of an example of a socket locking system consistent with the disclosure.

As illustrated in FIG. 1, the retention portion 112 can include a groove 113. The grove 113 can have a shape that mirrors a shape of a top surface of a PCB card. Thus, the groove 113 or other type of shaped region can have a shape that mirrors a shape of a top surface of a PCB card to provide enhanced contact via the groove 113 or other shaped region between the retention portion 112 and a top surface of a PCB card. For instance, in some examples the groove 113 can have a volume sized to receive the top surface (e.g., a portion of top surface 236 as illustrated in FIG. 2) of a PCB card in the volume of the groove 113. Thus, the retention portion 112 and/or the groove 113 can promote imparting a force on the PCB card at least along a vertical axis, as described herein.

FIG. 2 illustrates a diagram of an example of a socket locking system 220 consistent with the disclosure. As illustrated in FIG. 2, the system 220 can a socket 222 including a first locking handle 230 and a second locking handle 231, a PCB card 234, and a PCB retention band 200 including a groove 213. The PCB retention band 200 can be analogous or similar to the PCB retention band 100 as described herein with respect to FIG. 1.

Figure 3:
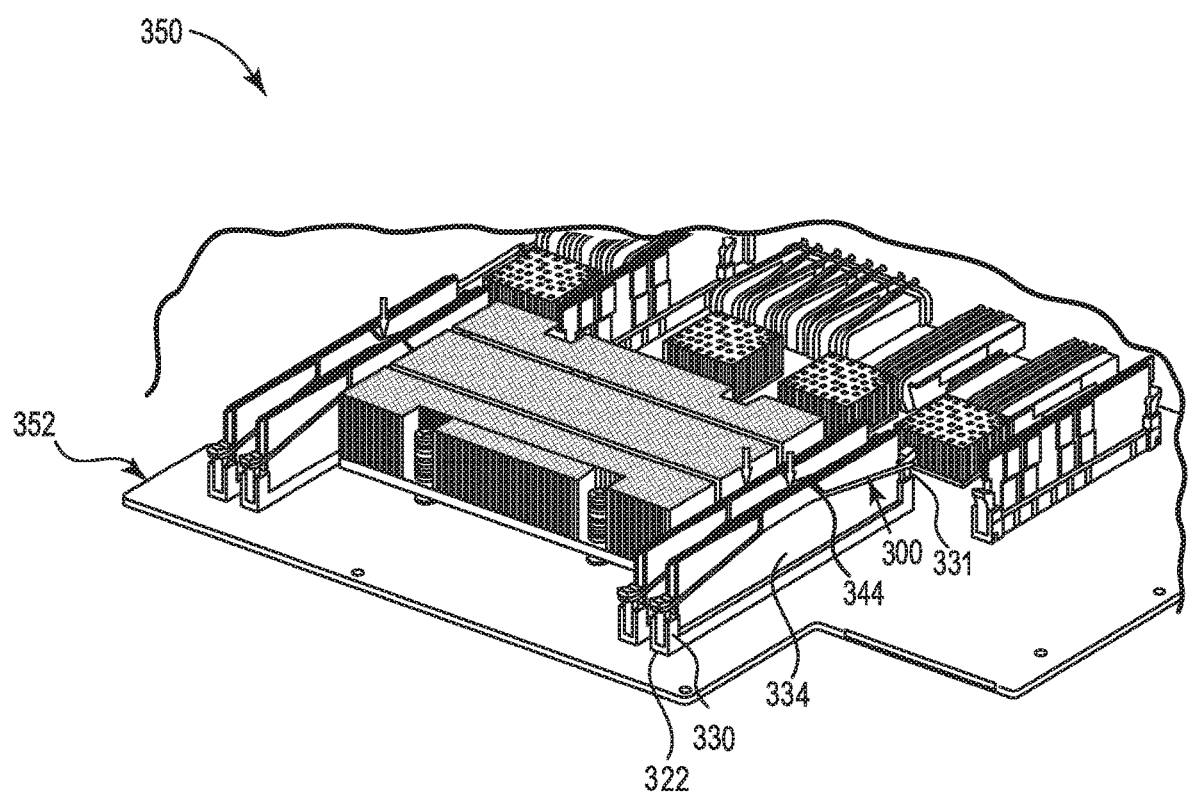
FIG. 3 illustrates a diagram of an example of a portion of a network device consistent with the disclosure.

The socket 222 can be formed as a slot configured to receive the PCB card 234. Furthermore, the socket 222 includes contacts (not illustrated) for providing electrical connectivity between the PCB card 234 and a PCB (e.g., PCB 352 as illustrated in FIG. 3). That is, a contact area of the PCB card 234 is shaped to correspond to the contact area of the receiving socket 222. Thus, when the PCB card 234 is inserted into the socket 222, electrical connection and communication is provided between the PCB card 234 and the socket 222 and indirectly between the PCB card 234 and a PCB via the socket 222.

The PCB card 234 further includes a notches and/or grooves such as a first notch 235 and a second notch (not illustrated) formed on opposite ends of the PCB card 234, respectively. The socket 222 includes locking handles such as the first locking handle 230 and the second locking handle 231. The locking handles are to be disposed at least partially in corresponding notches, as illustrated in FIG. 2 which details the first locking handle 230 disposed in the second notch and the second locking handle 231 disposed in the first notch 235.

Notably, the PCB retention band 200 can exert a first force (represented by arrow 240) and a second force (represented by arrow 242) along a horizontal axis (substantially parallel with a PCB, such as PCB 352 described herein with respect to FIG. 3) and exert a third force (represented by arrow 244) along a vertical axis (substantially perpendicular with the PCB). Thus, the PCB retention band 200 can arrest movement of the PCB card 234, such as a DIMM, along each of a vertical axis and horizontal axis to maintain the PCB card 234 in electrical communication with the PCB and/or otherwise prevent damage to the PCB card 234. That is, in some examples the PCB card 234 can be a DIMM, among other possibilities.

Notably, the socket locking system 220 is without clamping adapters and other additional components associated with other approaches that attempt to merely avoid an unintentional release of the locking handles. For instance, in some examples the socket locking system 220 is free of locking handle adapters. In such examples, the elongated closed loop 202 can directly contact (without intervening elements such as locking handle adapters) each of the first locking handle 230 and the second locking handle 231, as illustrated in FIG. 2.

In some examples, the retention portion 212 can have a width 233 that is greater than a width (e.g., width 106 as illustrated in FIG. 1) of the PCB card 234. In such examples, the retention portion 212 can contact a first face 240 and a second face (represented by 241) that is located on an opposite side of the PCB card 234. In some examples, the first face 240 and the second face 241 are of the same shape and size and located opposite to each other on the same PCB card 234. For instance, the PCB retention band 200 can contact each of the first locking handle 230, the second locking handle 231, the first face 240, the second face 241, and a top surface 236 of the PCB card. For example, the retention portion 212 can contact each of the first face 240, a second face 241, and the top surface 236 of the PCB card 234 when elongated closed loop forming 202 of the PCB retention band 200 is in contact with the first locking handle 230 and the second locking handle 231, as illustrated in FIG. 2. As mentioned, a portion of the top surface 236 of the PCB card can be disposed in the volume of the groove 213, as illustrated in FIG. 2.

FIG. 3 illustrates a diagram of an example of a portion of a network device 350 consistent with the disclosure. As used herein, the term "network device" can, for example, refer to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

In some examples, network device 350 can be an access point (AP). An AP can refer to a networking device that allows a wireless client device to connect to a wired or wireless network. As used herein, the term "access point" (AP) can, for example, refer to receiving points for any known or convenient wireless access technology which can later become known. Specifically, the term AP is not intended to be limited to IEEE 802.11-based APs. APs function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

In some examples, network device 350 can be a wireless local area network (WLAN) controller. The controller can include a processing resource such as a processing resource, memory, and input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. A controller can include a memory resource, including read-write memory, and a hierarch of persistent memory such as ROM, EPROM, and Flash memory. As used herein, the term "wireless client device" or "client device" can, for example, refer to a device including a processing resource, memory, and input/output interfaces for wired and/or wireless communication. For example, a wireless client device can include a laptop computer, a desktop computer, a mobile device, and/or other wireless devices, although examples of the disclosure are not limited to such devices. A mobile device can, for example, refer to devices that are (or can be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

As illustrated in FIG. 3, the network device 350 can include a PCB 352 including a socket 322, a PCB card 334 disposed at least partially in the socket 322, a first locking handle and a second locking handle to lock the PCB card in the socket 322, and a PCB retention band 300. The PCB retention band 300 can be analogous or similar to the PCB retention band 100 and/or 200 as described herein with respect to FIGS. 1 and 2, respectively. For instance, as mentioned the PCB retention hand can be formed by an elongated closed loop and a retention portion. The socket 322 can be analogous or similar to the sockets 222 described herein with respect to FIG. 2. The PCB card 334 can be analogous or similar to the PCB card 234 described herein with respect to FIG. 2.

As detailed above, the elongated closed loop can have a first distal end in contact with the first locking handle 330 and a second distal end in contact with the second locking handle 331. As detailed above, a retention portion in contact with a top surface of the PCB card to disposition the PCB card in the socket by imparting a force (represented by arrow 344) on the PCB card 334 at least along a vertical axis, as illustrated in FIG. 3. As used herein, "disposition" such as "disposition the PCB card in the socket" refers to application of a force to a PCB card in a vertical direction. That is, in some examples, the retention portion can contact a top surface of the PCB card 334 to imparts the force (represented by arrow 344) on the PCB card 334 at least along the vertical axis that is substantially perpendicular to a top surface of the PCB 352, as illustrated in FIG. 3.

While illustrated in FIG. 3 has have a given ratio of PCB retention bands, to PCB cards, and/or locking handles, a number of the PCB retention bands, the PCB cards, and/or the locking handles can be varied relative to each other. For example, two PCB cards can be secured by an individual PCB retention band, among other possible numbers of PCB cards. Similarly, an individual PCB card can be secured by two PCB retention bands, among other possible numbers of PCB retention bands.

For instance, in some examples, an individual locking handle can be contacted by two PCB retention bands to permit the individual locking handle via the two PCB retention bands to disposition two (or a different number) of PCB cards in sockets, among other possibilities. In some examples, a plurality of PCB retention bands (e.g., three PCB retention bands) can be daisy chained together between a first locking handle and a second locking handle to disposition a plurality of PCB cards (e.g., three PCB cards) in respective sockets (e.g., three sockets), among other possibilities.

Figure 4:
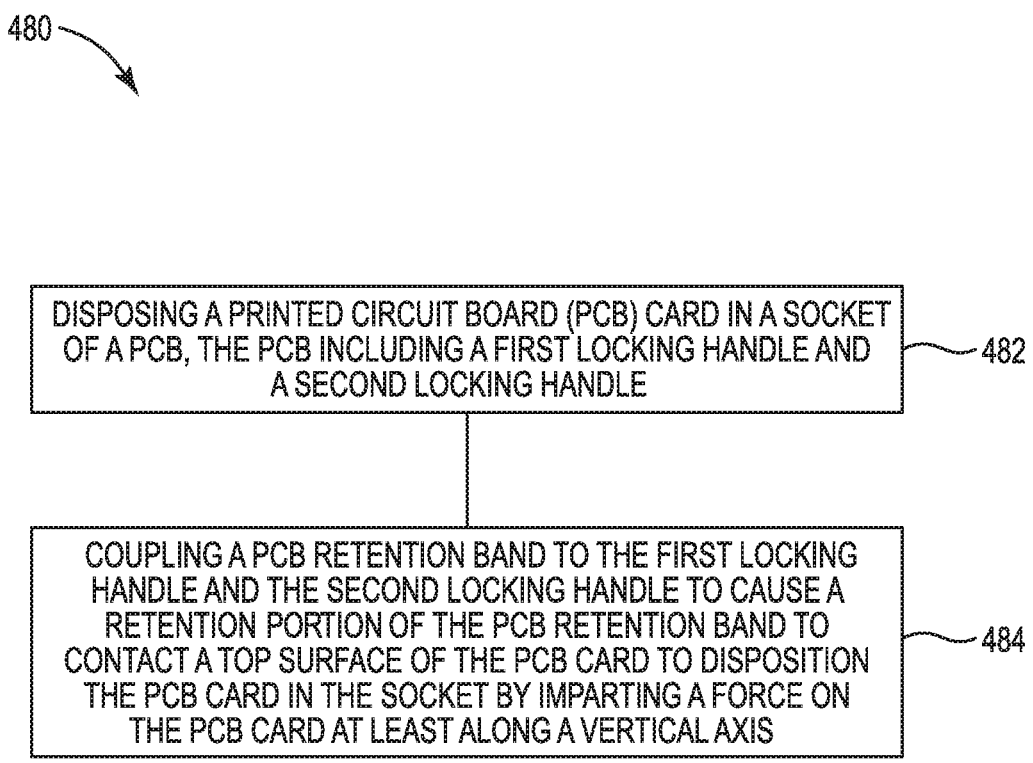
FIG. 4 illustrates an example of a method consistent with the disclosure.

FIG. 4 illustrates an example of a method 480 consistent with the disclosure. Method 480 can be performed in conjunction with by a PCB retention band, a socket locking system, and/or a network device, described in connection with FIGS. 1 and 2, respectively).

At 482, the method 480 can include disposing a PCB card in a socket of a PCB. As used herein, disposing refers to physically locating an object such as a PCB card at a given location. As mentioned, the PCB can include a first locking handle and a second locking handle. At 484, the method 480 can include coupling a PCB retention band to the first locking handle and the second locking handle to cause a retention portion of the PCB retention band to contact a top surface of the PCB card to disposition the PCB card in the socket by imparting a force on the PCB card at least along a vertical axis, is described herein.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense.

What is claimed:

1. A socket locking system comprising:
   a socket;
   a printed circuit board (PCB) card disposed in the socket;
   a first locking handle and a second locking handle to lock the PCB card in the socket; and
   a PCB retention band including:
      an elongated closed loop forming a first distal end and a second distal end opposite from the first distal end, wherein the first distal end is to contact the first locking handle and the second distal end is to contact the second locking handle; and
      a retention portion coupled to the elongated closed loop of material to contact a top surface of the PCB card to apply a force along at least a vertical axis of the PCB card in the socket, wherein the retention portion has a width that is greater than a width of the PCB card, wherein the retention portion is to contact each of a first face, a second face, and the top surface of the PCB card when the PCB retention band is in contact with the first locking handle and the second locking handle.

2. The system of claim 1, wherein the PCB card is a dual in-line memory module (DIMM) card.

3. The system of claim 2, wherein the system is free of locking handle adapters.

4. The system of claim 3, elongated closed loop directly contacts each of the first locking handle and the second locking handle.

5. A printed circuit board (PCB) retention band comprising:
   an elongated closed loop forming:
      a first distal end to contact a first locking handle of a socket included in a PCB; and
      a second distal end to contact a second locking handle of the socket;
   a retention portion disposed between the first distal end and the second distal end to contact a top surface of PCB card to apply a force along at least a vertical axis of the PCB card to retain the PCB card in the socket, wherein the retention portion includes a groove having a volume sized to receive a portion of the top surface of the PCB card in the volume of the groove.

6. The PCB retention band of claim 5, wherein the elongated closed loop defines a first opening and a second opening, and wherein the retention portion is disposed between the first opening and the second opening.

7. The PCB retention band of claim 5, wherein a length of the retention portion is less than a length of the elongated closed loop.

8. The PCB retention band of claim 5, wherein the retention portion is integral with the elongated closed loop.

9. The PCB retention band of claim 8, wherein the elongated closed loop is formed of a flexible material, wherein in the flexible material includes rubber, silicone rubber, or combinations thereof.

10. A network device comprising:
   a printed circuit board (PCB) including a socket;
   a PCB card disposed at least partially in the socket;
   a first locking handle and a second locking handle to lock the PCB card in the socket; and
   a PCB retention band formed by an elongated closed loop and a retention portion, the elongated closed loop having a first distal end in contact with the first locking handle and a second distal end in contact with the second locking handle, and the retention portion in contact with a top surface of the PCB card to disposition the PCB card in the socket by imparting a force on the PCB card at least along a vertical axis.

11. The network device of claim 10, wherein the retention portion in contact with the top surface of the PCB card imparts a force on the PCB card at least along the vertical axis that is substantially perpendicular to a top surface of the PCB.

12. The network device of claim 10, wherein the network device is a wireless local area network (WLAN) controller.

* * * * *